United States Patent
Cho (10) Patent No.: US 9,342,889 B2
(45) Date of Patent: May 17, 2016

(54) THREE-DIMENSIONAL MEASUREMENT SYSTEM AND METHOD THEREFOR

(71) Applicants: Chang-Suk Cho, Hwaseong-si (KR); WIPCO CO., LTD, Seongnam-si (KR)

(72) Inventor: Chang-Suk Cho, Hwaseong-si (KR)

(73) Assignees: Chang-Suk Cho (KR); WIPCO CO., LTD (KR)

( * ) Notice: Subject to any disclaimer, the term of this patent is extended or adjusted under 35 U.S.C. 154(b) by 0 days.

(21) Appl. No.: 14/002,216

(22) PCT Filed: Sep. 27, 2012

(86) PCT No.: PCT/KR2012/007809
§ 371 (c)(1),
(2) Date: Aug. 29, 2013

(87) PCT Pub. No.: WO2014/046325
PCT Pub. Date: Mar. 27, 2014

(65) Prior Publication Data
US 2015/0187081 A1    Jul. 2, 2015

(30) Foreign Application Priority Data
Sep. 24, 2012    (KR) .................. 10-2012-0105628

(51) Int. Cl.
*G06K 9/00* (2006.01)
*G06T 7/00* (2006.01)
*G01B 11/00* (2006.01)
*G01B 11/25* (2006.01)

(52) U.S. Cl.
CPC ............ *G06T 7/0057* (2013.01); *G01B 11/005* (2013.01); *G01B 11/254* (2013.01); *G06T 2207/10016* (2013.01); *G06T 2207/10028* (2013.01); *G06T 2207/30196* (2013.01)

(58) Field of Classification Search
None
See application file for complete search history.

(56) References Cited

U.S. PATENT DOCUMENTS

| 7,013,040 | B2 | 3/2006 | Shiratani |
| 2002/0196415 | A1* | 12/2002 | Shiratani ............... G01B 11/25 353/31 |
| 2011/0043609 | A1 | 2/2011 | Choi et al. |

(Continued)

FOREIGN PATENT DOCUMENTS

| JP | 2002191058 | 7/2002 |
| JP | 2004117235 | 4/2004 |
| JP | 2009236696 | 10/2009 |

(Continued)

OTHER PUBLICATIONS

International Search Report—PCT/KR2012/007809 dated Apr. 25, 2013.

*Primary Examiner* — Chan Park
*Assistant Examiner* — Elisa Rice
(74) *Attorney, Agent, or Firm* — Cantor Colburn LLP (57) ABSTRACT

A 3D measurement system and method therefor having improved precision can be provided by projecting a pattern using a grid pattern or a chessboard grid pattern and performing interpolation based on a method for measuring differences in illuminance. A 3D measurement system includes a coordinate value calculation unit for calculating 3D coordinate values from pattern image information captured using a predetermined pattern, and a depth value calculation unit for calculating a depth value at a first position from N pieces of illuminance image information captured using lighting devices installed at N different locations.

5 Claims, 10 Drawing Sheets

(56) References Cited

U.S. PATENT DOCUMENTS

2011/0164119 A1 7/2011 Jeong
2013/0335531 A1* 12/2013 Lee .................. G01B 11/25
　　　　　　　　　　　　　　　　　　　348/46

FOREIGN PATENT DOCUMENTS

| KR | 1020110018696 | 2/2011 |
| KR | 1020110080290 | 7/2011 |
| KR | 1020120098131 | 9/2012 |

* cited by examiner

THREE-DIMENSIONAL MEASUREMENT SYSTEM AND METHOD THEREFOR

BACKGROUND OF THE INVENTION

1. Field of the Invention

The present invention relates, in general, to a three-dimensional (3D) measurement system and method therefor and, more particularly, to a 3D measurement system and method, which use images captured by projecting a predetermined pattern onto a target object and image information obtained from a plurality of lighting devices.

2. Description of the Prior Art

The exact measurement of three-dimensional (3D) coordinates of a target object in a non-contact manner has been urgently required in all fields needing 3D data and, for this, stereo matching, pattern projection, etc. have been chiefly proposed.

Stereo matching is a method for calculating 3D coordinates using differences between the phases of corresponding points from images of a target object captured by two cameras having different views, and searching for the corresponding points between images is the key to this method. Further, stereo matching using two cameras enables measurement even for a moving image in which a target object is moving, and also enables measurement even if the surface of a target object is continuous, or includes a hidden face. However, a problem arises in that the results of searching for the corresponding points between images captured by two cameras are not reliable, and especially in a case where a target object does not have a characteristic pattern, material or design, matching points cannot be found.

Pattern projection is a method for measuring the distortion of a predetermined pattern by projecting the predetermined pattern onto a target object. Such a pattern projection method exhibits highly-reliable results, but intervals between lines determine the precision of measurement, so that precision is deteriorated, and reliable results cannot be exhibited in the case of a discontinuous surface.

SUMMARY OF THE INVENTION

The present invention has been made keeping in mind the above technical problems, and an object of the present invention is to provide a 3D measurement system and method, which project a pattern using a grid pattern or a chessboard grid pattern, and perform interpolation using a method for measuring differences in illuminance, thus further improving precision.

A three-dimensional (3D) measurement system according to a preferred embodiment of the present invention includes a coordinate value calculation unit for calculating 3D coordinate values from pattern image information captured using a predetermined pattern; and a depth value calculation unit for calculating a depth value at a first position from N pieces of illuminance image information captured using lighting devices installed at N different locations.

In detail, the predetermined pattern may be either a grid pattern composed of lines or a chessboard grid pattern in which internal grid cells of a grid are alternately filled. Further, the coordinate value calculation unit may include a line extraction unit for extracting border lines of a grid cell forming the predetermined pattern; and a first operational unit for calculating a depth value of the border lines from distortion of the border lines.

Preferably, the depth value calculation unit may include a second operational unit for calculating preliminary depth values at the first position within a single grid cell included in the predetermined pattern by calculating and integrating surface gradients to the first position using differences between illuminance values of the N pieces of illuminance image information, with respect to M respective base points. Further, the depth value calculation unit may further include a third operational unit for calculating a final depth value at the first position by averaging the M preliminary depth values at the first position calculated by the second operational unit. The M base points may be arbitrary points forming border lines of the single grid cell included in the predetermined pattern. The M base points may be vertices of the single grid cell included in the predetermined pattern.

A three-dimensional (3D) measurement method according to a preferred embodiment of the present invention includes calculating 3D coordinate values from pattern image information captured using a predetermined pattern; and calculating a depth value at a first position from N pieces of illuminance image information captured using lighting devices installed at N different locations. Preferably, the predetermined pattern may be either a grid pattern composed of lines or a chessboard grid pattern in which internal grid cells of a grid are alternately filled.

Calculating the coordinate values may include extracting border lines of a grid cell forming the predetermined pattern; and calculating a depth value of the border lines from distortion of the border lines. Further, calculating the depth value may include calculating preliminary depth values by calculating and integrating surface gradients to the first position within a single grid cell included in the predetermined pattern using differences between illuminance values of the N pieces of illuminance image information, with respect to M respective base points.

Preferably, calculating the depth value may further include calculating a final depth value at the first position by averaging the M preliminary depth values.

In accordance with the 3D measurement system and method therefor according to the preferred embodiments of the present invention, a 3D measurement system and method therefor having improved precision can be provided by projecting a pattern using a grid pattern or a chessboard grid pattern and performing interpolation based on a method for measuring differences in illuminance.

DETAILED DESCRIPTION OF THE EXEMPLARY EMBODIMENTS

Hereinafter, a 3D measurement system and method therefor according to embodiments of the present invention will be described with reference to the attached drawings.

The following embodiments of the present invention are merely intended to embody the present invention, and are not intended to restrict or limit the scope of the present invention. Contents that can be easily inferred by those skilled in the art from the detailed description and embodiments of the present invention are interpreted as being included in the scope of the present invention.

The 3D measurement system and method therefor according to the preferred embodiments of the present invention will be described briefly below. First, after a grid pattern or a chessboard pattern has been projected onto a target object, 3D depth information is obtained from the distortion of the grid pattern or the chessboard pattern. Next, the depth information of inside of the grid pattern or the chessboard pattern is obtained using a method for measuring differences in illuminance. In other words, overall 3D information is obtained by interpolating empty regions between pieces of depth information, which are obtained from the grid pattern or the chessboard pattern, with information obtained based on the illuminance difference measurement method. In accordance with the present invention, control may be performed such that reliable results are exhibited using a pattern projection method based on a grid or a chessboard so as to improve the precision of the illuminance difference measurement method and reduce accumulated errors.

Figure 1:
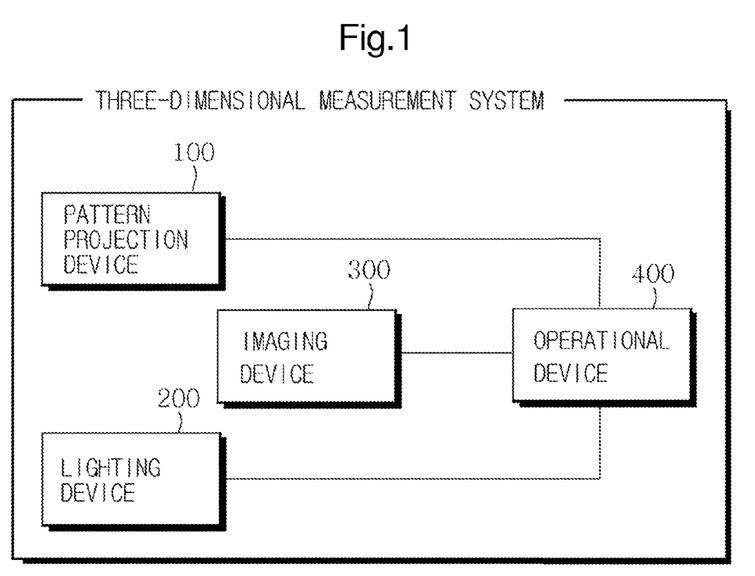
FIG. 1 is a block diagram showing a 3D measurement system according to a preferred embodiment of the present invention.

First, FIG. 1 illustrates a block diagram showing a 3D measurement system according to a preferred embodiment of the present invention.

As can be seen in FIG. 1, the 3D measurement system according to the preferred embodiment of the present invention includes a pattern projection device 100 for projecting a predetermined pattern onto a target object, a lighting device 200 for applying a predetermined illuminance to the target object, an imaging device 300 for capturing an image of the target object, and an operational device 400 for calculating 3D coordinate values of the target object using the image information acquired by the imaging device 300.

Figure 2A:
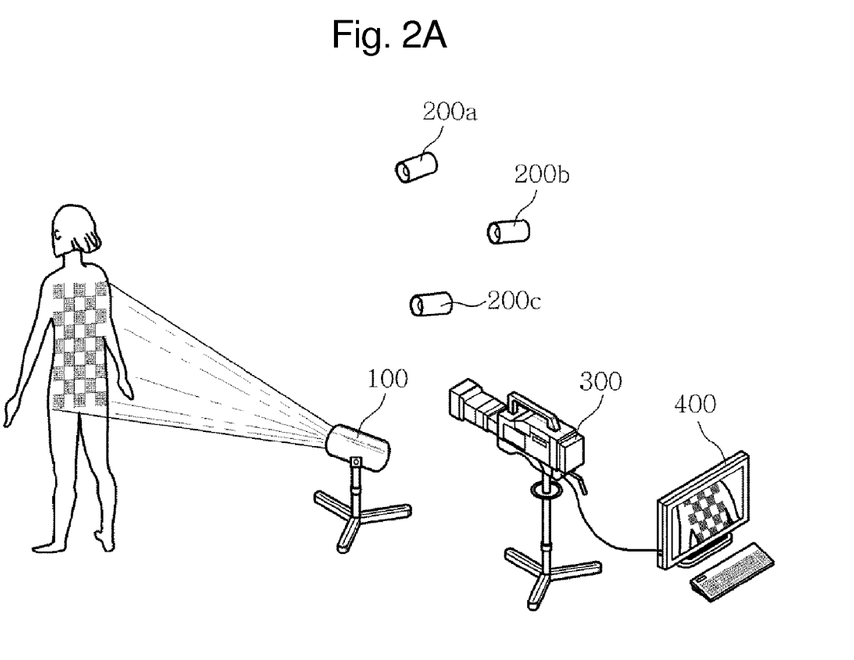
FIGS. 2A and 2B are diagrams showing a 3D measurement method using the 3D measurement system according to a preferred embodiment of the present invention.
Figure 2B:
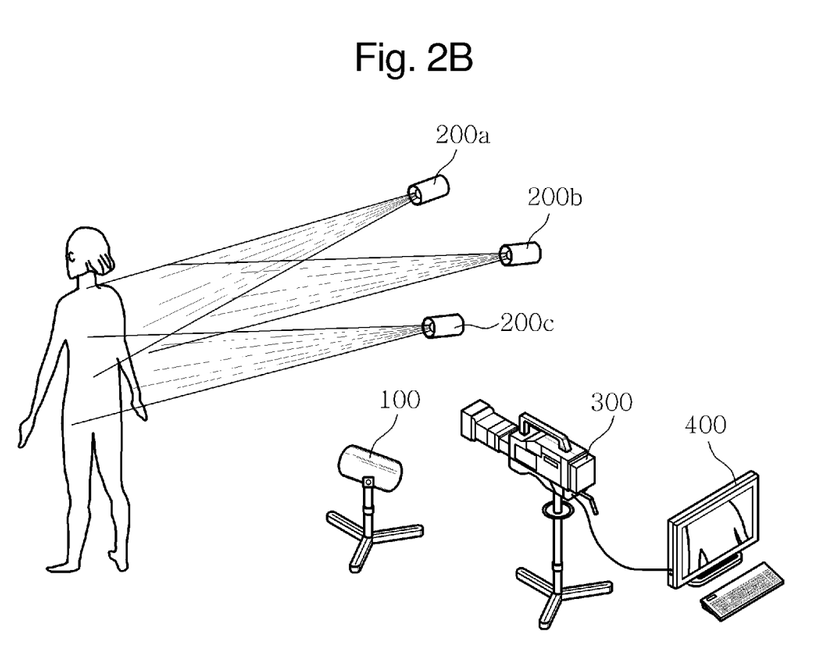

FIGS. 2A and 2B are diagrams showing a 3D measurement method using the 3D measurement system according to a predetermined embodiment of the present invention.

As can be seen in FIG. 2A, in the 3D measurement method using the 3D measurement system according to the present invention, the pattern projection device 100 projects a pattern onto a target object and then the imaging device 300 obtains image information. Next, as can be seen in FIG. 2B, N lighting devices 200a, 200b, and 200c are sequentially turned on, and the imaging device 300 captures individual images, and thus the imaging device 300 acquires N pieces of image information having differences in illuminance. Finally, the operational device 400 analyzes the pieces of acquired image information.

Figure 3A:
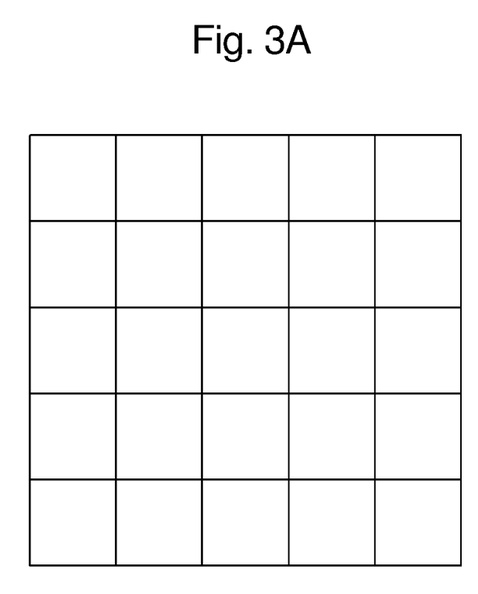
FIGS. 3A and 3B are diagrams illustrating a grid pattern or a chessboard grid pattern according to a preferred embodiment of the present invention.
Figure 3B:
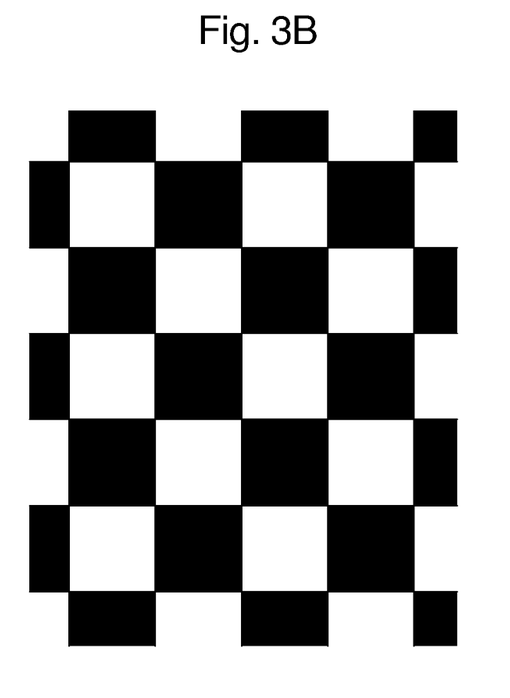

FIGS. 3A and 3B are diagrams respectively showing a grid pattern composed of lines and a chessboard grid pattern in which the internal grid cells of a grid are alternately filled, wherein the grid pattern or the chessboard grid pattern is to be projected by the pattern projection device 100 according to a preferred embodiment of the present invention.

The lighting devices 200 according to the present invention are installed at N different locations and allow the imaging device 300 to capture pieces of luminance image information from the N locations. In this case, the imaging device 300 according to the present invention may be implemented using various cameras, such as a camera using a typical Charge Coupled Device (CCD) or a camera using a Complementary Metal-Oxide-Semiconductor (CMOS) image sensor or the like. Pieces of image information of a target object acquired by the imaging device 300 are sent to the operational device 400 and then 3D coordinate values of the target object are finally calculated.

That is, the present invention acquires a single piece of pattern image information by projecting the grid pattern or the chessboard grid pattern onto the target object, and then obtains a 3D depth value of the object from the vertical and horizontal distortion of the pattern. The 3D coordinates calculated from the 3D depth value correspond only to the border lines of the grid pattern or the chessboard grid pattern. 3D depth values within the grid pattern other than the border lines are obtained using the measurement of differences in illuminance. Such illuminance difference measurement is to receive differences between illuminance values from N pieces of image information, acquired by alternately turning on light sources in N directions and capturing images of a target object, and the surface incidence angle of light as input values, obtain the gradients of the surface on a pixel basis, integrate the gradients, and calculate 3D information of the surface.

In detail, a method of calculating 3D coordinate values using the operational device 400 according to a preferred embodiment of the present invention will be described below.

Figure 4:
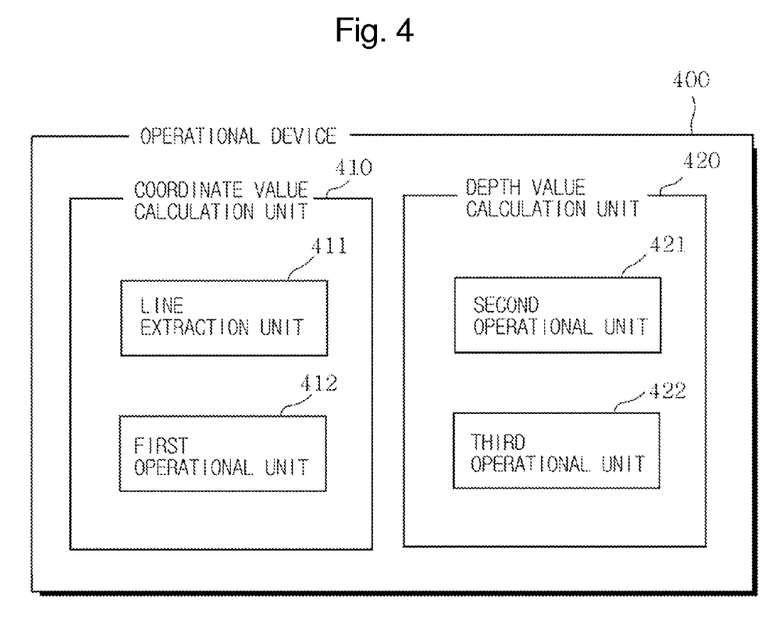
FIG. 4 is a block diagram showing an operational device according to a predetermined embodiment of the present invention.

FIG. 4 illustrates a block diagram showing the operational device 400 according to a preferred embodiment of the present invention. As can be seen in FIG. 4, the operational device 400 according to the present invention includes a coordinate value calculation unit 410 and a depth value calculation unit 420.

First, the coordinate value calculation unit 410 calculates 3D coordinate values from pattern image information captured using a predetermined pattern. As shown in FIGS. 3A and 3B, the predetermined pattern according to the preferred embodiment of the present invention is a grid pattern composed of lines, or a chessboard grid pattern in which the internal grid cells of a grid are alternately filled.

The coordinate value calculation unit 410 according to the present invention includes a line extraction unit 411 and a first operational unit 412. The line extraction unit 411 extracts border lines of a grid cell forming the predetermined pattern. Further, the first operational unit 412 functions to calculate the plane information values and depth value of the border lines by analyzing the distortion of the border lines. Here, the plane information values denote x and y coordinate values of 3D coordinate values, and the depth value denotes the z coordinate value of the 3D coordinate values.

Figure 5:
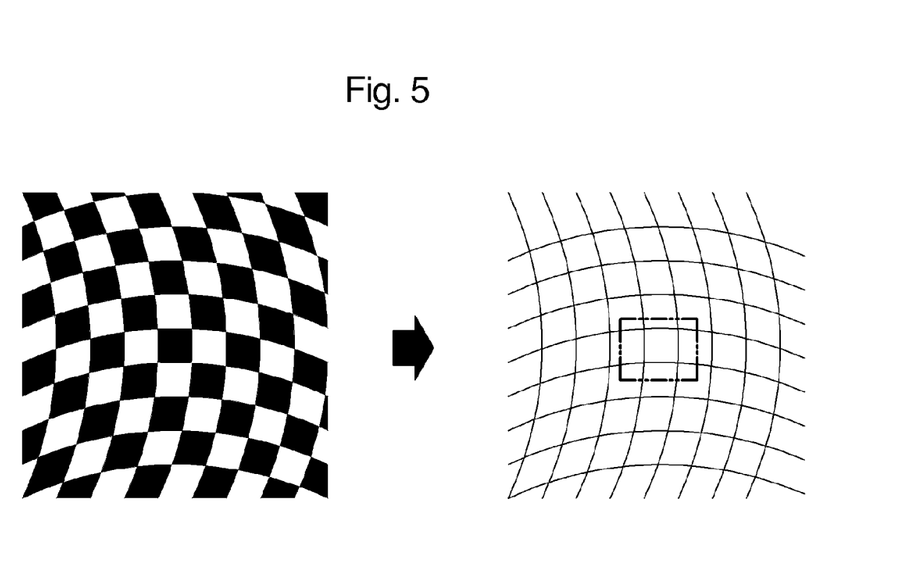
FIG. 5 is a diagram showing a distorted chessboard grid pattern obtained due to the curvature of a target object and the extraction of border lines.

FIG. 5 illustrates diagrams individually showing a distorted chessboard grid pattern obtained due to the curvature or the like of a target object and the extraction of border lines.

The depth value calculation unit 420 according to the present invention calculates a final depth value at a first position within a single grid cell included in the predetermined pattern from N pieces of illuminance image information captured by lighting devices 200 installed at N different locations.

A method of calculating a depth value using the depth value calculation unit 420 according to the present invention will be described below.

If it is assumed that I is the amount of light obtained from a sensor, r and I are the reflectivity of light and the unique reflectivity of a target object, respectively, and then θ is set as the incidence angle of light with respect to the surface of the target object, diffused reflection of light is given by the following Equation 1:

$$I = rI \cos \theta \quad \text{[Equation 1]}$$

If Equation 1 is rearranged and simplified, it is represented by a unit vector formula of I=S·V. If it is assumed that N lighting devices 200 are three lighting devices, an unknown quantity is a surface gradient vector V=[$v_x$, $v_y$, $v_z$] when I denotes the respective amounts of light obtained from light sources in three directions of I=[$i_1$, $i_2$, $i_3$], and the incidence angle configured from x-y-z directions of the light sources in three directions is S=[($s_{x1}$, $s_{y1}$, $s_{z1}$), ($s_{x2}$, $s_{y2}$, $s_{z2}$), ($s_{x3}$, $s_{y3}$, $s_{z3}$)]. Therefore, it can be seen that, if the incidence angle and the amount of light are known, a surface gradient can be obtained, and then surface height, that is, a depth value, can be obtained by integrating the surface gradient.

The depth value calculation unit 420 according to the present invention includes a second operational unit 421 and a third operational unit 422.

The second operational unit 421 calculates preliminary depth values at an arbitrary first position within a single grid cell included in a predetermined pattern by calculating and integrating surface gradients to the first position using differences between illuminance values of N pieces of illuminance image information, with respect to M respective base points. The third operational unit 422 calculates a final depth value at the first position by averaging the M preliminary depth values at the first position calculated by the second operational unit 421. Accordingly, it can be seen that errors can be further reduced by calculating the final depth value using such an average.

The M base points in the present invention are characterized in that they are arbitrary points forming the border lines of the single grid cell included in the predetermined pattern. More preferably, M base points are the vertices of the single grid cell included in the predetermined pattern.

Figure 6:
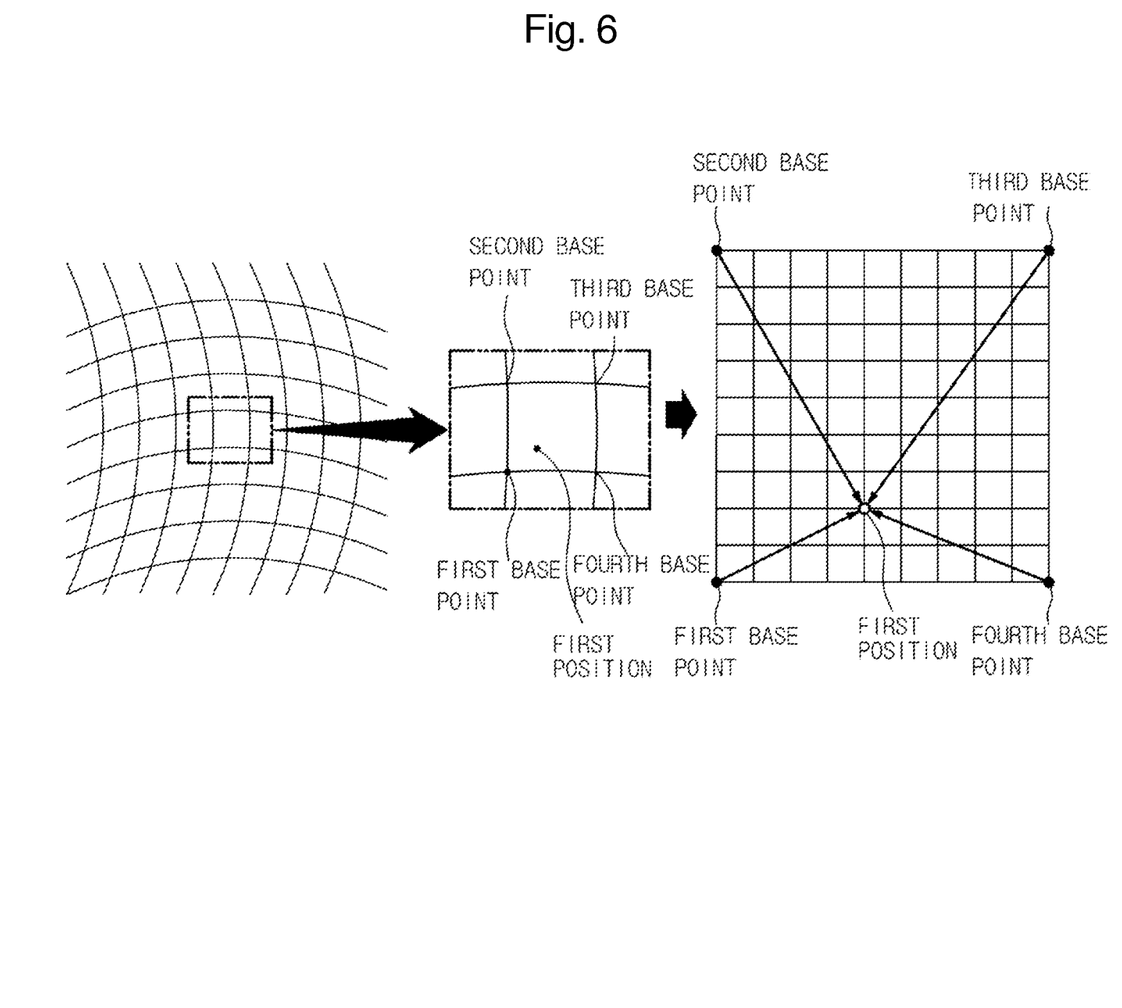
FIG. 6 is a diagram showing the calculation of a final depth value at a first position by averaging preliminary depth values at the first position obtained from four base points.

FIG. 6 is a diagram showing the calculation of a final depth value at a first position by averaging preliminary depth values at the first position obtained from four base points. That is, as can be seen in FIG. 6, the 3D measurement system according to the present invention calculates respective integrated values from the first to fourth base points and averages the four integrated values.

Figure 7:
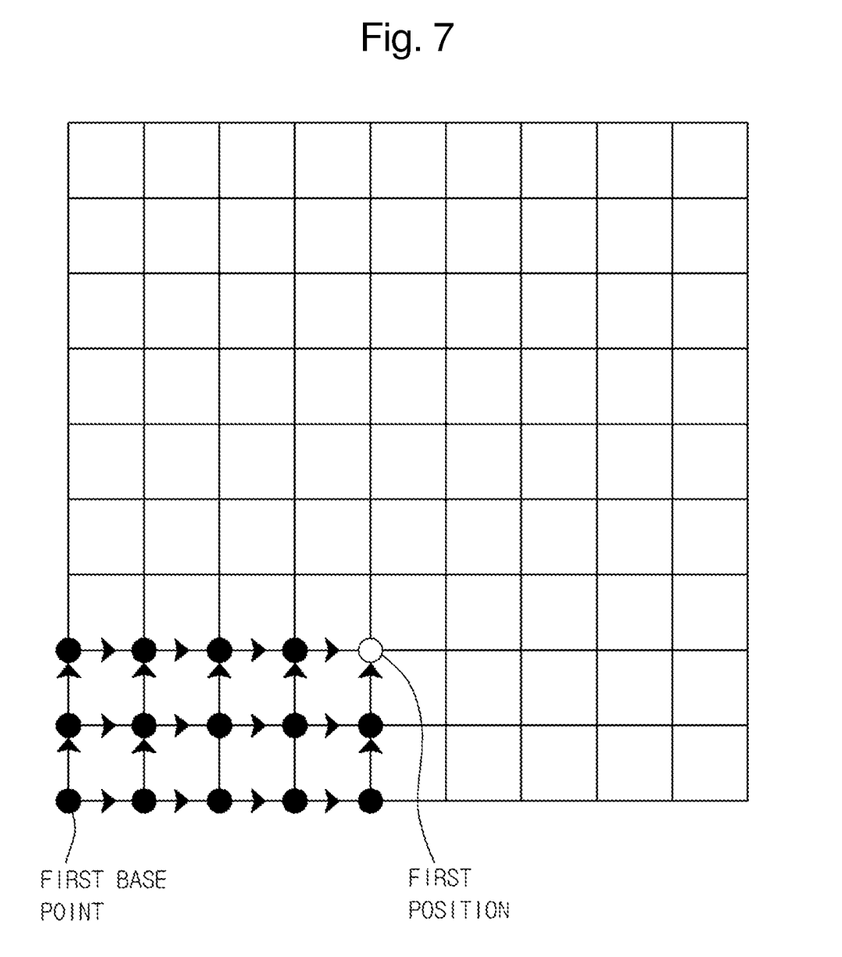
FIG. 7 is a diagram illustrating a sequence for calculating and integrating a surface gradient to a first position within a single grid cell using a second operational unit.

FIG. 7 is a diagram illustrating a sequence for calculating and integrating a surface gradient from a first base point to an arbitrary first position within a single grid cell included in a predetermined pattern using the second operational unit 421. As can be seen in FIG. 7, a preliminary depth value at the first position may be calculated by sequentially calculating and integrating surface gradients from the first base point to the first position on a pixel basis.

However, in the present invention, the final depth value at the first position is calculated with improved precision by calculating and averaging depth values with respect to a plurality of base points rather than calculating a depth value with respect to a single base point.

Figure 8:
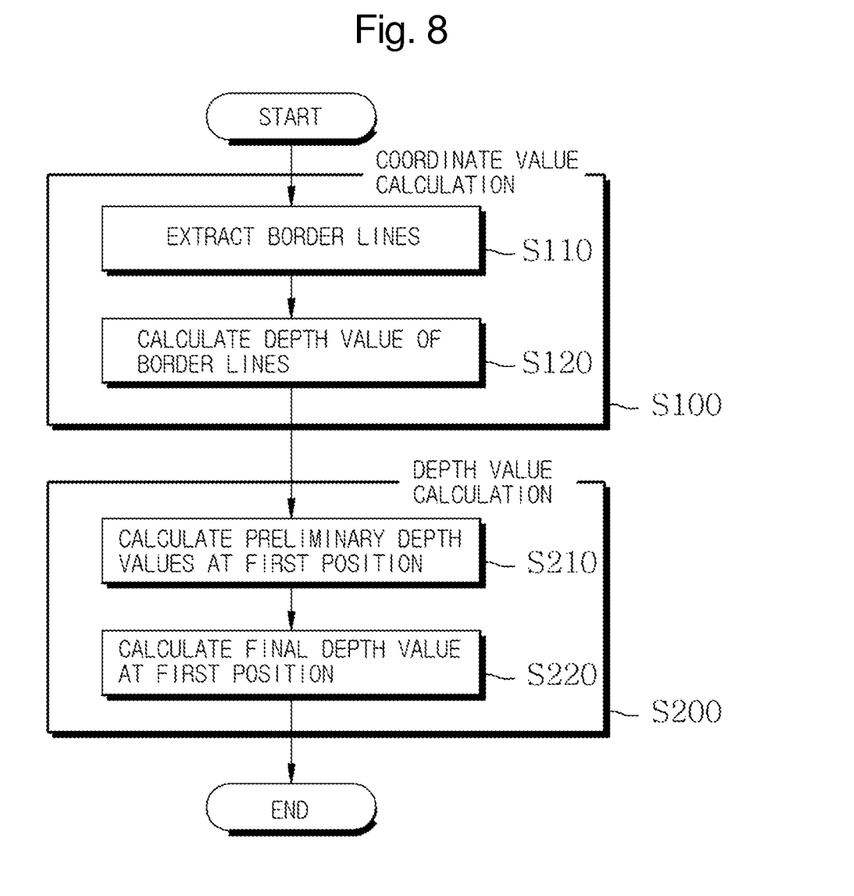
FIG. 8 is a flowchart showing a 3D measurement method according to a preferred embodiment of the present invention.

FIG. 8 is a flowchart showing a 3D measurement method according to a predetermined embodiment of the present invention. As can be seen in FIG. 8, the 3D measurement method according to the preferred embodiment of the present invention includes the coordinate value calculation step S100 of calculating 3D coordinate values from pattern image information captured using a predetermined pattern, and the depth value calculation step S200 of calculating a depth value at a first position from N pieces of illuminance image information captured using lighting devices 200 installed at N different locations.

The coordinate value calculation step S100 according to the present invention includes the step S110 of extracting the border lines of a grid cell forming a predetermined pattern, and the step S120 of calculating the plane information value and the depth value of the border lines from the distortion of the border lines.

The depth value calculation step S200 according to the present invention preferably includes the step S210 of calculating preliminary depth values at an arbitrary first position within a single grid cell included in the predetermined pattern by calculating and integrating surface gradients to the first position using differences between the illuminance values of N pieces of illuminance image information, with respect to the M respective base points, and calculating a final depth value at the first position by averaging the M preliminary depth values.

As described above, in accordance with the 3D measurement system and method therefor according to the preferred embodiments of the present invention, a 3D measurement system and method therefor having improved precision can be provided by projecting a pattern using a grid pattern or a chessboard grid pattern and performing interpolation based on a method for measuring differences in illuminance.

What is claimed is:

1. A three-dimensional (3D) measurement method comprising:
    calculating 3D coordinate values from pattern image information captured using a predetermined pattern; and
    calculating a depth value at a first position from N pieces of illuminance image information captured using lighting devices installed at N different locations,
    wherein calculating the coordinate values comprises:
    extracting border lines of a grid cell forming the predetermined pattern; and
    calculating a depth value of the border lines from distortion of the border lines.

2. The 3D measurement method of claim 1, wherein calculating the depth value comprises calculating preliminary depth values by calculating and integrating surface gradients to the first position within a single grid cell included in the predetermined pattern using differences between illuminance values of the N pieces of illuminance image information, with respect to M respective base points.

3. The 3D measurement method of claim 2, wherein calculating the depth value further comprises calculating a final depth value at the first position by averaging the M preliminary depth values.

4. The 3D measurement method of claim 3, wherein the M base points are arbitrary points forming border lines of the single grid cell included in the predetermined pattern.

5. The 3D measurement method of claim 3, wherein the M base points are vertices of the single grid cell included in the predetermined pattern.

* * * * *